June 18, 1963   A. ANGIOLETTI   3,093,866
APPARATUS FOR PRODUCING RUBBER GLOVES
Filed July 24, 1961   4 Sheets-Sheet 1
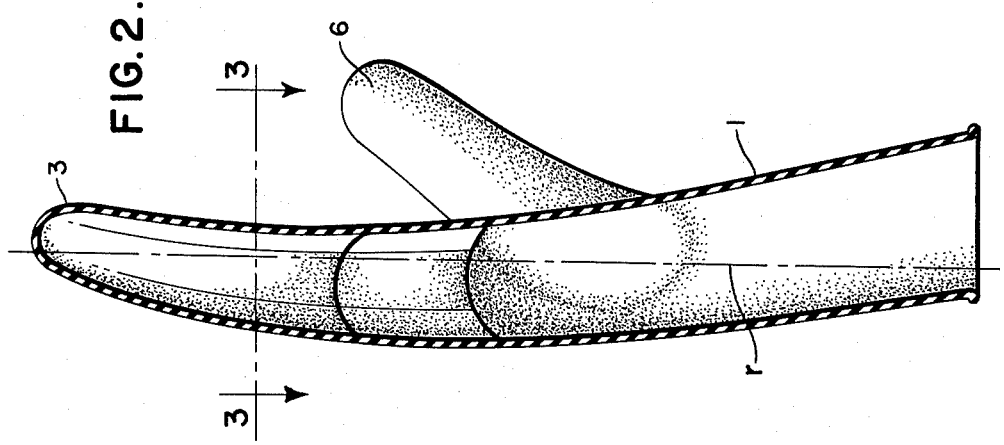
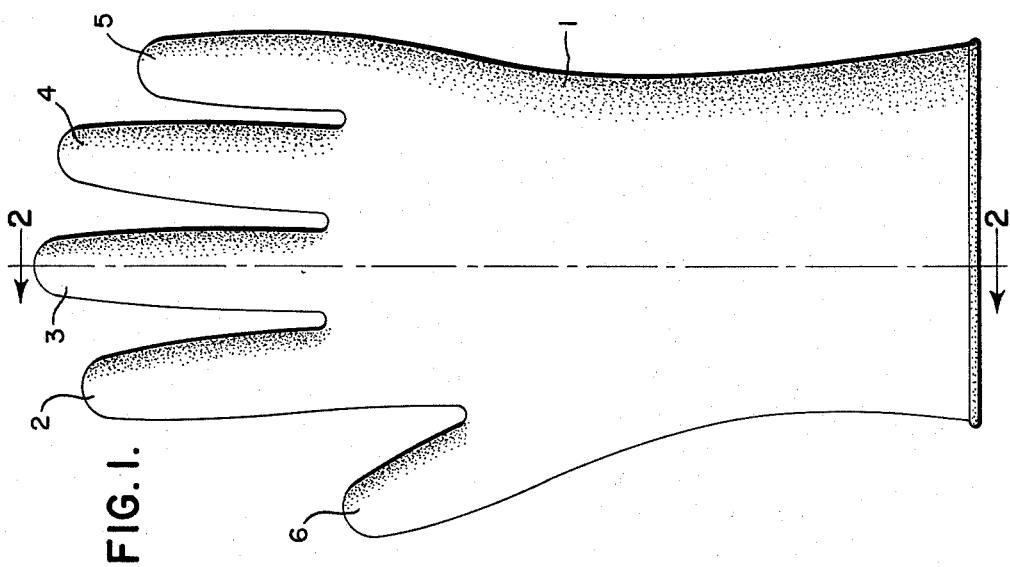
INVENTOR
Attilio Angioletti
BY
*Stevens, Davis, Miller & Mosher*
ATTORNEYS June 18, 1963  A. ANGIOLETTI  3,093,866
APPARATUS FOR PRODUCING RUBBER GLOVES
Filed July 24, 1961  4 Sheets-Sheet 3

INVENTOR
Attilio Angioletti

BY
*Stevens, Davis, Miller & Mosher*
ATTORNEYS

INVENTOR
Attilio Angioletti

United States Patent Office 3,093,866
Patented June 18, 1963

3,093,866
APPARATUS FOR PRODUCING RUBBER GLOVES
Attilio Angioletti, Milan, Italy, assignor to
Pirelli S.p.A., Milan, Italy
Filed July 24, 1961, Ser. No. 126,077
Claims priority, application Italy Aug. 6, 1960
4 Claims. (Cl. 18—42)

The present invention relates to rubber gloves and, more particularly, it concerns rubber gloves produced by a molding operation.

Heretofore, rubber gloves produced by molding were obtained by vulcanization within a mold composed of an inner (male) portion and outer (female) portion, the latter being divided into two superposed elements in which the impressions were essentially symmetrical. Generally speaking, the contact surface of the two elements forming the female part of the mold was completely flat and, in fact, constituted the plane of symmetry of the glove. Under this arrangement, undercuts in the mold would be avoided. However, the glove which was produced from this mold would have a configuration which would not correspond to the natural form of the hand in which the thumb would be in opposition to the other figures; furthermore, this glove would not have a shape corresponding to the customary position of the hand at rest, namely where the fingers are slightly curved. It follows, therefore, that a glove produced from the above mold and having all of its fingers straight and the thumb coplanar with the fingers, will not readily conform to the shape of the hand and will not allow easy bending.

On the other hand, it is possible to produce rubber gloves having a configuration similar to the natural shape of the hand in the relaxed state. Gloves of this nature can be produced by a dipping process in which the form is suitably shaped so as to conform with the natural shape of the hand in relaxed condition. This form is dipped into rubber latex and the resulting glove, after suitable treatment, is peeled from the form. Nevertheless, the dipping process has certain inconveniences and difficulties; in particular it is considered to be particularly disadvantageous when special latex compounds, for instance, those based on synthetic rubbers, are to be used.

The present invention involves loading a suitable mold with a rubber compound, closing the mold, subjecting the mold to appropriate temperature and pressure for vulcanizing, cooling the mold, and, finally, removing the molded article from the mold. The mold is so shaped that the longitudinal axes of the four fingers, except the thumb, lie in a first plane whereas the longitudinal axis of the thumb lies in a second plane forming a given angle with the first plane. The impressions of the fingers are also slightly curved towards the palm of the hand. The impression of the glove and of the fingers and thumb are such that no undercuts are produced. The arrangement is such, therefore, as not to affect the closure and aperture of the mold and the removal of the molded article.

The mold comprises an inner (male) part and outer (female) part, the latter being divided into two sections. On each of these sections, the contact face which carries the impression of the glove, is constituted by two longitudinal plane surfaces which are inclined with respect to one another to form an angle equal to that formed by the plane of the hand with the plane defined by the forefinger and the thumb. One of the surfaces of each section of the female part of the mold carries the complementary impression of the glove and the forefinger, middle finger, ring finger and little finger; the other surface of each section carries the complementary impression of the thumb disposed in a direction which is inclined with respect to the general disposition of the other fingers. The other section of the female part carries, on its corresponding inclining surfaces, the other complementary impressions of the glove.

Another feature of the present invention is concerned with the cross-sectional shape of the fingers in relation to the contact line between the two sections of the female mold. More precisely, each finger except for its tip, has a cross-sectional shape defined by two opposed semi-circles interconnected by two straight lines. Thus, the sides of the fingers are substantially flat. The same is also true of the side edges of the glove. The curvature of the fingers is such that the contact line between the two sections of the female part of the mold will always fall along the flat surfaces of the fingers or the side edges of the glove. Thus, even though the fingers have a curved shape and, despite the fact that these fingers have a substantially rounded cross section, nevertheless undercuts are avoided. Therefore, the removal of the male part of the mold from the female part is permitted without compromising the integrity of the molded glove assembled on the male element.

According to another embodiment of the present invention, the female part of the mold is subdivided into two superposed sections, each having a spherical contact surface. In one case, the spherical contact surface on one section is concave and the corresponding surface on the other section is convex, these shapes corresponding to the curvature to be imparted to the fingers of the glove and to the position of opposition to be imparted to the thumb. By using a mold of this type, the cross section of the impressions for the fingers can be circular or elliptical without causing undercuts. In such a case, the contact line between the two elements of the female part of the mold runs along a spherical surface and is incident, respectfully, to the diameter or to the smaller axis of the cross section of the impression of each finger. The male part of the mold conforms to the shape of the two female sections of the mold.

Therefore, it is a principal object of the present invention to provide apparatus of the type described above which is capable of producing a rubber glove of desired shape which, heretofore, could only be produced by a dipping process.

It is a further object of the present invention to provide apparatus for producing rubber gloves as set forth above wherein the occasion of undercuts is substantially eliminated.

Other and further objects and advantageous features of the present invention will hereinafter more fully appear in connection with a detailed description of the drawings in which:

FIGURE 1 is a rear elevation of a right-hand glove made in accordance with the present invention;

FIGURE 2 is a cross-sectional view taken along section line 2—2 of FIGURE 1;

Figure 3:
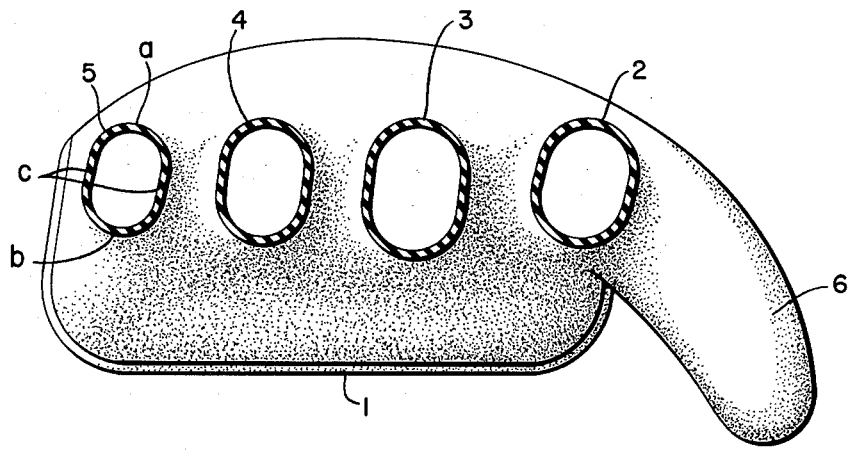
FIGURE 3 is a cross-sectional view taken along section line 3—3 of FIGURE 2.
Figure 4:
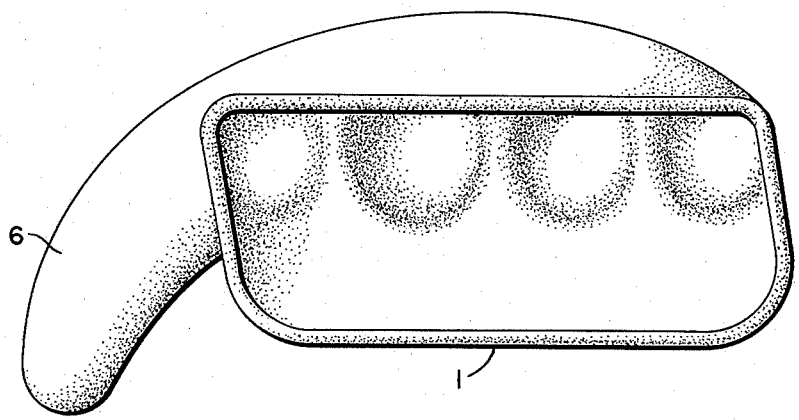
FIGURE 4 is a bottom view of the glove shown in FIGURE 1 to 3.
Figure 5:
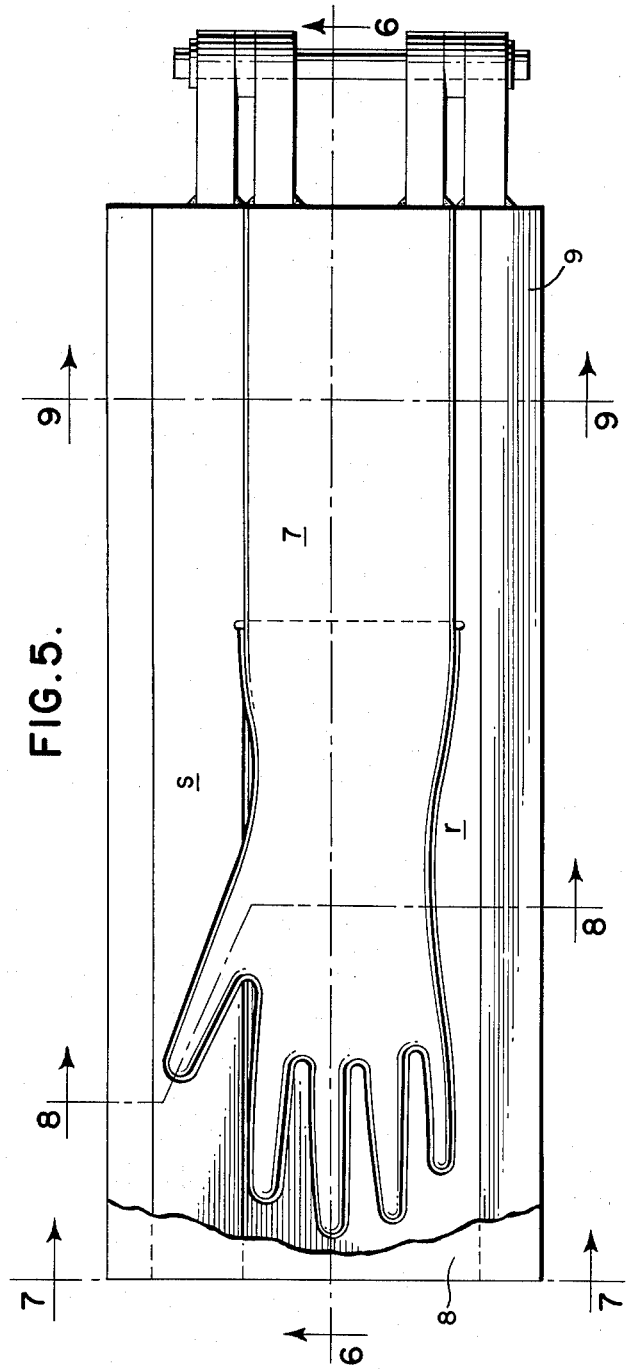
FIGURE 5 is a plan view of the mold elements, with the upper mold element being broken away, for making a left-hand glove in accordance with the present invention.

Referring to the drawings in detail, FIGURES 1 to 4 show a glove 1 having fingers 2, 3, 4 and 5, arranged substantially in transverse alignment but being curved slightly in the direction of the palm of the hand. The glove also includes a thumb 6 which is offset with respect to the fingers. Thus, the glove 1 has a shape corresponding to the normally relaxed position of the hand.

Referring to FIGURES 5 to 9, the mold itself is composed of a male part 7 and a female part comprising upper and lower mold halves 8 and 9. The contacting faces of the elements 8 and 9 are generally defined by two longitudinal planes, $r$ and $s$ inclined with respect to each other at an angle $\alpha$, the latter being substantially equal to the angle formed by the plane of the palm with the plane which is defined by the forefinger and the thumb. The larger surface $r$ of both elements 8 and 9 of the female components of the mold carries the complementary impressions of the glove for the four fingers while the smaller surface $s$ carries the complementary impressions for the thumb.

From a consideration of FIGURE 3, it should be apparent that the glove fingers have, in cross section, an outer shape defined by two opposite semi-circles $a$ and $b$ interconnected by two straight lines $c$. Whereas the above description appears on FIGURE 3 only with respect to the small finger 5, it should be apparent that the remaining fingers 2, 3 and 4 have a similar shape. Thus, the impressions of the fingers in the female portions 8 and 9 of the mold correspond with the configuration of the two semi-circles interconnected by the two straight lines. In FIGURE 2, the vertical dot-and-dash line represents the position of the surface $r$ relative to the glove itself. It should be apparent from FIGURE 2 that the surface $r$ intersects the glove only along the flat surfaces corresponding to the two connecting straight lines $c$. This arrangement eliminates the formation of undercuts and excessive sprue.

Figure 6:
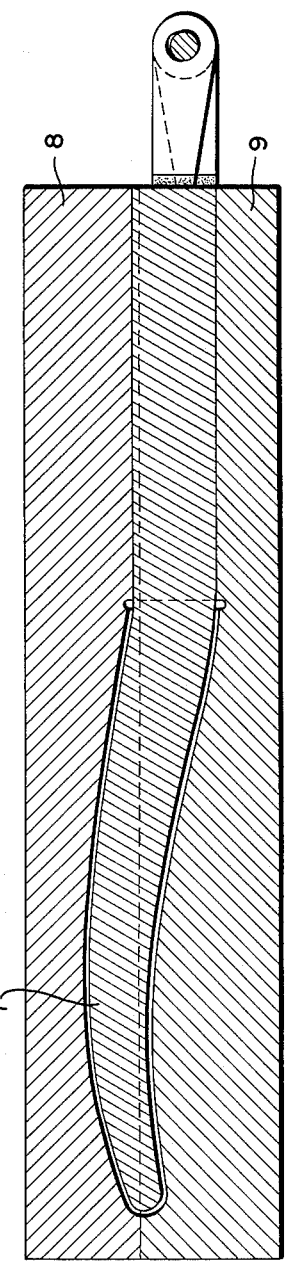
FIGURE 6 is a longitudinal cross-sectional view taken along section line 6—6 of FIGURE 5 showing, in particular, the relationship between the male member and the two female portions of the mold.
Figure 7:
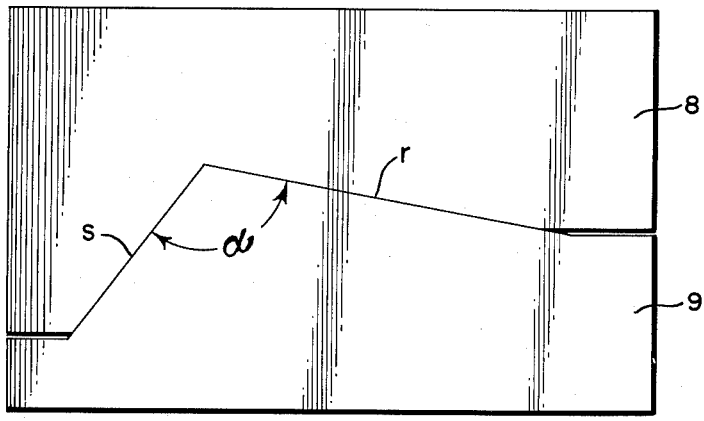
FIGURE 7 is a left-hand end view of the mold as it would appear along viewing line 7—7 of FIGURE 5.
Figure 8:
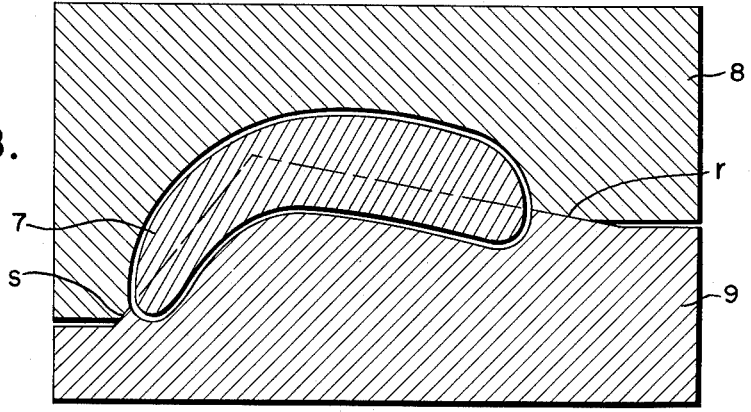
FIGURE 8 is a cross-sectional view taken along section line 8—8 of FIGURE 5.
Figure 9:
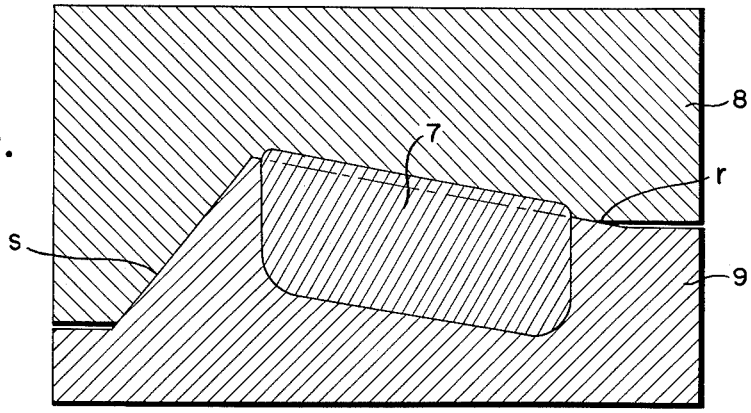
FIGURE 9 is a cross-sectional view taken along section line 9—9 of FIGURE 5.

From a consideration of FIGURE 6, it should be apparent that the right-hand portion of the composite mold is such that the male member 7 is in close fitting relation with respect to the upper and lower sections 8 and 9; on the other hand, the left-hand portion of the male member 7 is shaped to conform with the internal configuration of the glove, while the corresponding portions of the mold sections 8 and 9 are correspondingly spaced from the male member 7 and are shaped to conform with the outer configuration of the glove. The three mold sections 7, 8 and 9 are conveniently movable with respect to one another, as for example, by a hinged structure.

Other and further modifications of the present invention, apart from those shown or suggested herein, may be made within the spirit and scope of this invention. So, for instance, in the description and in the claims the term "rubber" indicates the material to be used for the process and in the mold in accordance with the invention; it is however understood that analogous materials as synthetic resins, for example polyvinyl chloride, can be used for the same purpose.

What is claimed is:

1. A mold for the formation of a rubber glove wherein the portions adapted to form the fingers of the said glove, are curved longitudinally downwardly in the direction outwardly of the palm in conformity with the relaxed position of the hand with the thumb being in opposition to the other fingers, said mold comprising a male part and a female part subdivided into two sections, the contact faces of each section being defined by two longitudinal plane surfaces which are inclined with respect to each other, one surface carrying the complementary impressions for the glove and for four fingers and the other surface carrying complementary impressions for the thumb, the angle between said surfaces being equal to that formed by the plane of the palm with the plane defined by the forefinger and the thumb.

2. A mold as set forth in claim 1 wherein said female sections have a portion of a cross section corresponding to an area defined by two opposite semi-circles interconnected by two straight lines.

3. A mold as set forth in claim 2 characterized in that the impressions for the fingers obtained on the female sections have such a curvature that the contact line for the two portions of the female part of the mold, in relation to said impressions, falls within the plane defined by the straight lines connecting the semi-circles of the corresponding cross sections.

4. A mold as set forth in claim 3 characterized in that the male part has an outer shape conforming to the impression of the glove obtained in the two sections of the female part.

References Cited in the file of this patent

UNITED STATES PATENTS

| | | |
|---|---|---|
| 1,894,066 | Smith | Jan. 10, 1933 |
| 2,357,360 | Rollmann | Sept. 5, 1944 |
| 2,358,341 | Malm | Sept. 19, 1944 |
| 2,886,824 | Smith | May 19, 1959 |